United States Patent [19]

Nussbaum

[11] 4,319,738

[45] Mar. 16, 1982

[54] LIFTING MECHANISMS ESPECIALLY LIFTING PLATFORM

[75] Inventor: Hans Nussbaum, Bodersweier, Fed. Rep. of Germany

[73] Assignee: Otto Nussbaum G.m.b.H. & Co. KG, Fertigungstechnik und Maschinenbau, Kehl-Bodersweier, Fed. Rep. of Germany

[21] Appl. No.: 128,243

[22] Filed: Mar. 7, 1980

[30] Foreign Application Priority Data

Mar. 8, 1979 [DE] Fed. Rep. of Germany ....... 2909171

[51] Int. Cl.³ .............................................. B66F 7/14
[52] U.S. Cl. ................................................ 254/89 R
[58] Field of Search ................ 254/98, 89 R; 192/141; 74/424.8 R, 89, 15; 188/67, 110, 202, 196 BA

[56] References Cited

U.S. PATENT DOCUMENTS 3,687,234 8/1972 Gendreau ..................... 187/8.41 X
3,707,930 1/1973 Yindra et al. ...................... 74/424.8
4,022,428 5/1977 Mantha .......................... 187/8.97 X
4,076,216 2/1978 Nussbaum ............................ 254/98

FOREIGN PATENT DOCUMENTS 1307 6/1889 Switzerland .

Primary Examiner—Robert C. Watson
Attorney, Agent, or Firm—Cushman, Darby & Cushman

[57] ABSTRACT

A lifting mechanism with a lifting platform, a lifting column supporting the platform, a threaded catch rod attached to the column, and an easily workable nut mounted on the rod and surrounded by a housing forming part of the platform. The housing engages the nut through a ball bearing and spring so that the nut rotates and moves up and down with the platform during normal operation. If the platform moves downward rapidly the spring is compressed and a projection on the housing engages the nut to stop downward movement of the platform.

5 Claims, 3 Drawing Figures

LIFTING MECHANISMS ESPECIALLY LIFTING PLATFORM

The invention pertains to a lifting mechanism especially a lifting platform with at least one lifting column in which a lifting carriage receiving the load is shiftable along a catch rod, attached on the lifting column.

Such a catch rod is provided for example in the case of a two-column lifting platform on that lifting column, on which the lifting carriage is moved from the driver lifting column by means of a chain or a rope. Such a lifting platform is described for example in German Application DE-OS 26 49 769. In case the lifting nut breaks and the chain goes slack or else in case of a break of the chain, an engagement member is made to fit against the catch rod which holds the lifting carriage with the load firmly on the catch rod. Although such catching devices operate reliably when in action, still the possibility exists that the engagement member or the chain scanner is blocked or is impeded in its function, so that the engaging member does not or does not in time come to fit against the catch rod.

The invention is based on the task of developing a catching device in such a way that it will operate even more reliably and that the possibility of a failure of the catching device is practically impossible.

This task is solved according to the invention, in that an freely moving nut is disposed on a catch rod provided with a thread, which is supported on the topside and underside on the lifting carriage as relative to the latter, and in that a braking projection is provided on the lifting carriage which may be made to fit against the nut.

During normal operations, the easily moving nut, for example, a rotary ball nut, is driven by the lifting carriage up and down in case of the lifting and lowering movement, whereby as a result of the easy movement of the nut, no notably greater expenditure of force is needed in case of the lifting motion of the lifting carriage. Whenever, for example, the chain carrying the lifting carriage breaks, then the lifting carriage instantly, and as a result of the starting accelerated lowering motion, comes to rest on the easily moving nut, whereby a rotary movement of the nut is prevented at the same time and thus the lifting carriage is held securely on the catch rod provided with a thread. Thus, a chain-scanner, needed in case of the known catching devices is omitted, in case of which there exists a danger of blocking or of getting caught, the easily moving nut may be disposed, protected within the lifting carriage, whereby its reliable functioning will be ensured further.

According to an effective development, the easily moving nut is supported via a spring on the lifting carriage, on the topside and underside and is held at a distance from said carriage, whereby a ball bearing may be provided between the spring and the nut.

An embodiment of the invention is explained subsequently in more detail on the basis of the drawing by way of example.

Figure 1:
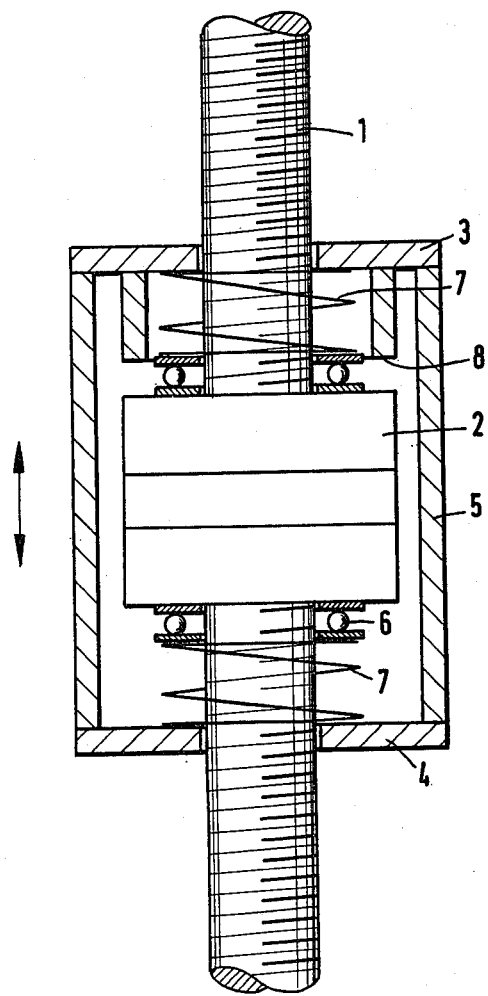
FIG. 1 shows a schematic representation of the catching device with the nut disposed on the catch rod in the position during normal operation.

In the figures, the numeral 1 designates a threaded catch rod, which with its upper end (not shown) is suspended in a lifting column of a lifting platform. A rotary ball nut 2 engages with the thread, which is supported on both sides on supports 3 and 4, which are either attached or the lifting carriage guided in the lifting column or else are parts of the lifting carriage. In case of the embodiment shown, a housing 5 surrounding and protecting the nut is provided, which is part of the lifting carriage, and is disposed separately in the lifting carriage, and may be connected firmly with it. This housing 5 does not rotate; it is merely shifted up and down in the direction shown by the arrow on the fixed catch rod 1 by the movement of the lifting carriage.

The rotary ball nut 2 is provided both on the topside and the underside with a ball bearing 6 which supports a compression spring 7, which fits against the corresponding abutment 3 or 4. In case of normal operation of the lifting platform, the rotary ball nut 2 is driven elastically by the lifting carriage or by the housing 5, whereby it rotates on the catch rod 1, developed as a spindle.

Figure 2:
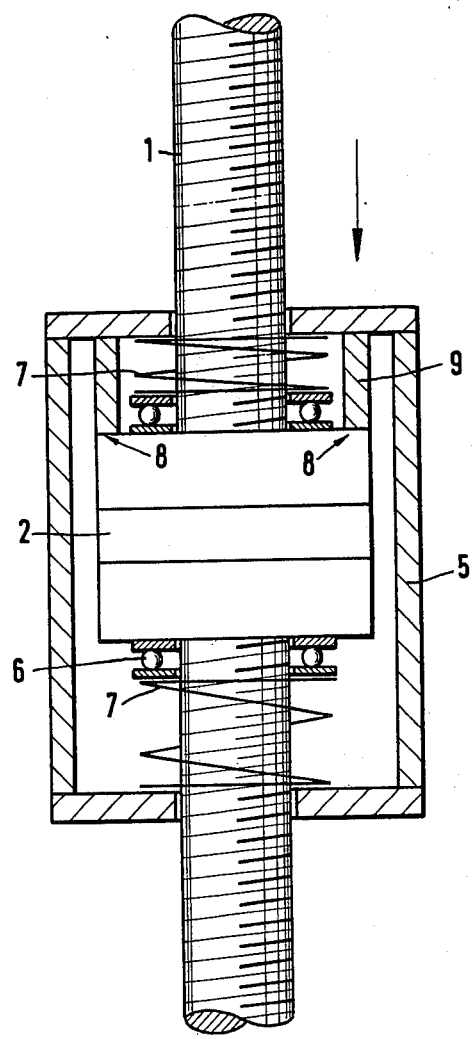
FIG. 2 shows the position of the individual construction units of the catching device with the captured load.

If the lifting nut on the other driven lifting column, provided with a motor, breaks or whenever the chain bearing the lifting carriage with the housing 5 breaks, then instantly the load born by this lifting carriage is activated in the direction of the arrow in FIG. 2 which forces the lifting carriage or the housing 5 more quickly downward than during the lowering movement in normal operation. In this case, the upper correspondingly weakly designed compression spring 7 is compressed since the rotary ball nut is incapable of following this lowering movement of the housing 5, starting at an accelerated pace so that the housing 5 contacts a braking projection 8 to fit against the rotary ball nut 2 and prevents a rotary movement of said nut on catch rod 1. This position is shown in FIG. 2. The braking area 8 in case of this embodiment is developed on the front side of a supporting ring 9 which is attached to the housing 5. As a result of the load engaging at the braking area 8, the lifting carriage is held securely on the catch rod 1 by the rotary ball nut 2, despite the fact that the thread for the nut 2 moves easily and has no automatic locking.

Various modifications of the construction according to the invention are possible. That, for example, the support ring 9 may be attached to the housing 5 adjustably so that the distance between the braking area 8 and the corresponding counter area on the rotary ball nut 2, existing during normal operation, may be adjusted. Instead of the ball bearings 6 corresponding slip planes may be provided on nut 2, or else on the spring plates, which permit an easy-moving relative movement between springs 7 and nut 2. Instead of the rotary ball nut, a planetary roller nut may also be provided for example which is likewise easy moving and has no automatic locking.

According to another development, the easily moving nut 2 may be provided with a conical section, which engages in the braking position as in FIG. 2 with a corresponding conical braking area on the lifting carriage or, on the housing 5.

According to still another development, the easily moving nut 2, may be provided with a centrifugal clutch, which establishes a firm connection with the lifting carriage or the housing 5, in case of a higher rpm of the nut 2, than predetermined for normal operations. In case of such an embodiment, the centrifugal clutch takes over the function of the upper spring 7 of the construction according to the FIGS. 1 and 2. In case of this latter construction, an arrangement is provided by the upper spring 7, which in case of a relative movement in an axial direction between lifting carriage or housing 5 and easily moving nut 2, activates a brake on said nut. In case of a centrifugal clutch an increased relative movement in peripheral direction between easily moving nut 2 and fixed housing 5 is used for disengaging the brake.

Possibly two mechanisms may be combined. A threaded spindle with a tempered surface is provided effectively as a catch rod.

Figure 3:
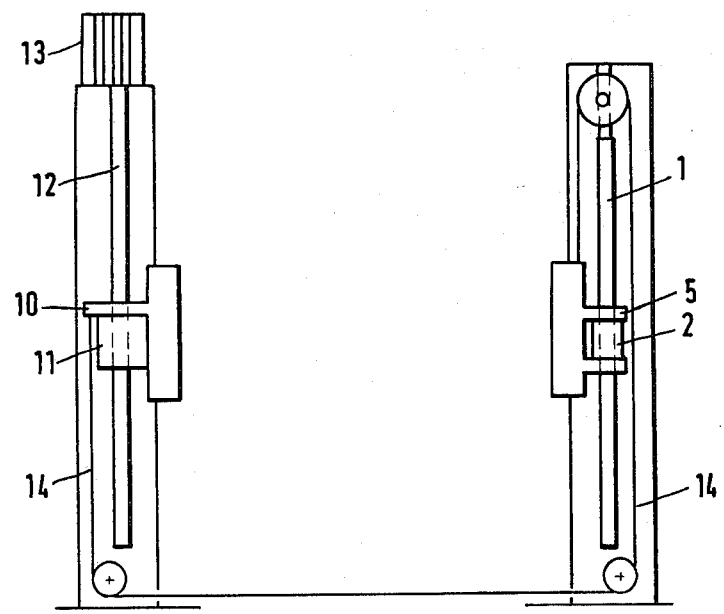
FIG. 3 shows an overall view of a two-column lifting platform with the built-in safety mechanism according to the invention.

FIG. 3 shows an overall view of a two-column lifting platform, whereby the lifting carriage 10 on the left hand lifting column is driven by a spindle 12 by way of a lifting nut 11, which is made to rotate by a motor 13. The driven lifting carriage 10 is connected via a chain or a rope 14 with the lifting carriage 5 on the other lifting column, so that the latter is moved synchronously along with the driven lifting carriage 10. The lifting carriage 5 is lifted and lowered along the catch rod 1. The safety device described in the FIGS. 1 and 2 is disposed in the lifting carriage 5.

For the sake of a simpler presentation, the telescoping arms, provided usually on the lifting carriages have not been shown.

What is claimed is:

1. A lifting mechanism comprising:
a lifting platform having at least one lifting column;
a threaded catch rod attached to said column; and
an easily workable nut mounted on said rod and guided by said platform for rotation and movement up and down with said platform,
a compressable spring between said platform and the top side of said nut,
said platform having a portion engaging said nut when said spring is compressed to thereafter prevent rotation of said nut and downward movement thereof in the event of rapid downward movement of said platform.

2. A mechanism as in claim 1 further including a ball bearing between said spring and top side of said nut.

3. A mechanism as in claim 2 including a second spring and ball bearing between the bottom side of said nut and said platform.

4. A mechanism as in claim 1 wherein said platform includes a housing surrounding said nut and axially slidable along said rod, said portion being a projection extending downward from the top of said housing.

5. A mechanism as in claim 1 wherein said nut is a rotary ball nut.

* * * * *